3,227,152
PORTABLE FORCED AIR HEATER
Joachim Weinhold, Hamburg-Billwerder, Germany, assignor to North American Philips Company, Inc., New York, N.Y., a corporation of Delaware
Filed Jan. 28, 1963, Ser. No. 254,203
Claims priority, application Germany, Feb. 2, 1962, P 28,726
5 Claims. (Cl. 126—110)

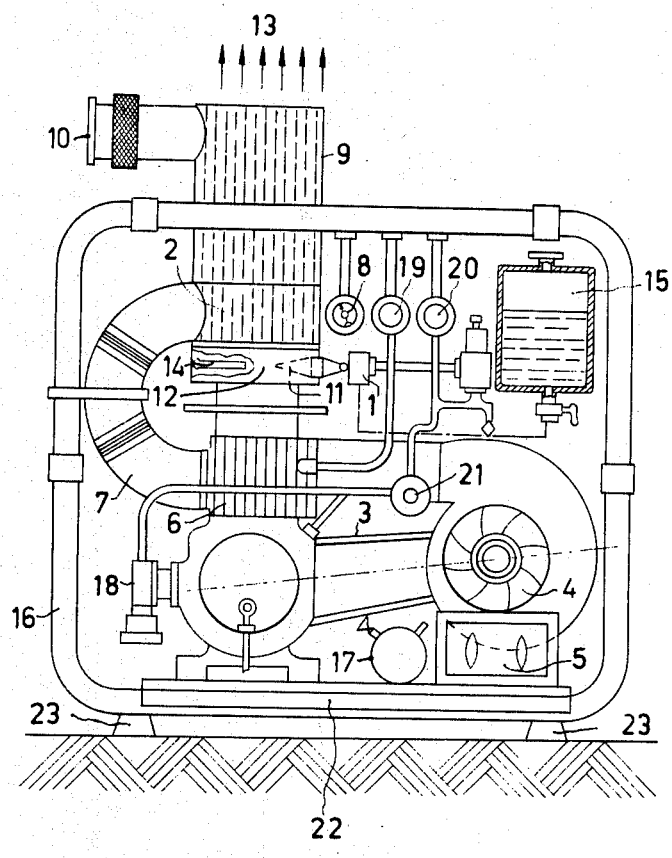

Forced air heaters are known in which the heated air is supplied by means of a heat exchanger. In addition it is known to use for these purposes the heat to be dissipated of internal combustion engines and to obtain in this manner heat for space heating purposes in addition to the mechanical power. With a view to the fact that it is necessary in internal combustion engines to maintain a given temperature, the use of such engines would be uneconomical, if they were used for heating purposes only, in particular if they are used for heating larger spaces, not counting the required additional technical plant necessary for the internal combustion engines.

Therefore, a new movable space heating device is proposed which according to the invention is characterized in that it comprises a hot-gas engine having a fan driven by it for the supply of air via the cooler and via a heat exchanger provided on the heater of that engine.

The new heating device has the advantage that it supplies a larger heat transmission with a relatively inexpensive cost of operation and that it is, in addition, independent of the fuel. Moreover, no electrical auxiliary devices are necessary during operation, such as a battery or a generator and electrical ignition devices respectively. In addition the device is comparatively silent which is of advantage if it is used for a prolonged period of time. Moreover, the number of pipes through which the air emerges may be minimized also in case spaces are to be heated which are not sound tight.

Since the hot air leaves the emerging aperture of the device under relatively high pressure, the new device is particularly suitable also to heat machine aggregates, for example aero-engines or the like.

In order that the invention may readily be carried into effect, an embodiment thereof will now be described more fully, by way of example, with reference to the accompanying drawing, the single figure of which shows an elevational view thereof.

A burner 1 heats the heater 2 of a hot-gas engine and causes the engine to supply mechanical energy to the driving belt 3, the motor driving a fan 4 with a given transmission. The construction of a hot-gas engine is well known. The fresh air may be drawn in by a single-stage radial fan at 5 and directed, via the cooler 6 of the hot-gas engine, into the outlet 10 through the air pipe 7 and through the heat exchanger 9 on the heater 2. From the burner 1, the flame 11 enters the combustion chamber 12. The heat present in the flame gases is partially supplied to the heater 2 to produce the mechanical force for the fan. The combustion chamber 12 is part of the heater 2, the latter being of a conventional construction. The gases which are still very hot now flow through the heat exchanger which consists of pipes and emerge at 13. The air for the constant combustion in continuous operation is also supplied by the radial fan 4.

The control device 14 which is provided with a strong bimetallic strip is adjusted so as to protect the heater of the engine from overheating. With respect to the amount of heat which the burner 1 has to supply to the heater of the hot-gas engine aggregate, the burner 1 is preferably overproportioned. Since the air flow can be chosen such that it is greater than necessary for the cooler, a particularly satisfactory and sufficient cooling of the cooler of the hot-gas engine is obtained. The temperature of the heater may in this manner be raised up to the admissible limit, so that very favourable thermodynamic conditions prevail.

In the burner 1 the required fuel from the fuel tank 15 is mixed with the required air for combustion. The compressed air required for starting the aggregate is stored in the frame 16 consisting of tubular material and in the compressed air tank 17. The compressed air is produced by the air compresser 18 which is also driven by the hot-gas engine. The pressure in the frame and in the compressed air tank 17 may be read from the manometer 8. The compressed air in frame 16 is supplied to air compressor 18 through valves 20 and 21. This compressed air is supplied to the heater 2 by means of the blower 4.

The valves 19 to 21 are required for starting the aggregate and for pumping up the compressed air system. The whole aggregate is mounted in the frame on a base plate 22. The mounting of the heating device may be effected by means of a vibration-damping metal buffer 23. The heated air which emerges through the nozzle 10 may now be supplied through a flexible connection to the space to be heated.

The valve 19 is opened during the starting period. During this period the head of the engine is warmed up by the burner while the engine is not running and the fan 4 is inoperative. During this period compressed air from frame 16 and container 17 flows through valve 19 and into the cooler and thereupon through the duct 7 and the heat exchanger 9. The compressed air is used during the starting up period for directing a flow of air through valve 19, through cooler 6 and heat exchanger 9. Furthermore, during the starting up period valve 20 is open so that compressed air will flow to the burner 1. Under normal operating conditions, valve 19 is closed and compressor 18 delivers compressed air to frame 16, container 17 and to burner 1. Valve 20 is closed when the pressure in frame 16 is high enough. Valve 21 is closed during the starting period and open in normal operation.

The burner 1 of the hot-gas engine which is operated with compressed air is suitable for a range of fuels, that is to say by changing the burner nozzle all kinds of fuels including gasoline and Diesel oil may be used with one burner.

What is claimed is:

1. A forced air heater system comprising a hot-gas engine having a cooler, a heater provided with a combustion chamber, and a heat exchanger; means forming a heated air outlet from said heat exchanger, said cooler and heat exchanger being provided with air passages therethrough, a source of heat for said hot-gas engine, connecting means whereby combustion gases from said heat source flow in the combustion chamber of the heater and through said heat exchanger and out of said system, a fan for drawing in atmospheric air into said system and having its outlet connected to said cooler, driving means interconnetcing said hot-gas engine with said fan to drive the latter, duct means connecting said cooler with said heat exchanger whereby said atmospheric air from the outlet of said fan is passed in series first through said cooler and then through said heat exchanger and the heated atmospheric air is projected out of said outlet from said heat exchanger.

2. A forced air heater system comprising a hot-gas engine having a cooler, a heater provided with a combustion chamber, and a heat exchanger; means forming a heated air outlet from said heat exchanger, said cooler and heat exchanger being provided with air passages therethrough, a source of heat for said hot-gas engine, connecting means whereby combustion gases from said heat source flow in the combustion chamber of the heater and through said heat exchanger and out of said system, a fan for drawing in atmospheric air into said system and having its outlet connected to said cooler, driving means interconnecting said hot-gas engine with said fan to drive the latter, duct means connecting said cooler with said heat exchanger whereby said atmospheric air from the outlet of said fan is passed in series first through said cooler and then through said heat exchanger and the heated atmospheric air is projected out of said outlet from said heat exchanger, and a bimetallic strip control device connected to said heater to thereby limit the temperature of said heater.

3. A forced air heater system as claimed in claim 1 wherein said heat source is a burner with a replaceable nozzle to accommodate a different fuel.

4. A forced air heater system comprising a hot-gas engine having a cooler, a heater provided with a combustion chamber, and a heat exchanger; means forming a heated air outlet from said heat exchanger, said cooler and heat exchanger being provided with air passages therethrough, a source of heat for said hot-gas engine connecting means whereby combustion gases from said heat source flow in the combustion chamber of the heater and through said heat exchanger and out of said system, a fan for drawing in atmospheric air into said system and having its outlet connected to said cooler, driving means interconnecting said hot-gas engine with said fan to drive the latter, duct means connecting said cooler with said heat exchanger whereby said atmospheric air from the outlet of said fan is passed in series first through said cooler and then through said heat exchanger and the heated atmospheric air is projected out of said outlet from said heat exchanger, an air compressor driven by said hot-gas engine, a hollow frame in communication with said compressor for storing compressed air and functioning additionally as a support for said hot-gas engine and said fan, and means for conducting said compressed air to said heat source.

5. A forced air heater system as claimed in claim 1 wherein the heater of said hot-gas engine has a heat delivery capacity which exceeds the normal heat requirements of said engine.

References Cited by the Examiner
UNITED STATES PATENTS

| | | | |
|---|---|---|---|
| 2,339,254 | 1/1944 | Dill | 126—110 |
| 2,716,975 | 9/1955 | Johnston | 126—110 |
| 2,717,591 | 9/1955 | Bachle | 126—110 |
| 2,975,783 | 3/1961 | Dalenbach | 126—110 |

FOREIGN PATENTS

| | | |
|---|---|---|
| 111,503 | 9/1940 | Australia. |

JAMES W. WESTHAVER, *Primary Examiner.*

FREDERICK L. MATTESON, Jr., *Examiner.*